(12) United States Patent
Ganhotra et al.

(10) Patent No.: US 11,941,414 B2
(45) Date of Patent: Mar. 26, 2024

(54) UNSTRUCTURED EXTENSIONS TO RPA

(71) Applicant: International Business Machines Corporation, Armonk, NY (US)

(72) Inventors: Jatin Ganhotra, White Plains, NY (US); Sachindra Joshi, Gurgaon (IN); Nathaniel Mills, Coventry, CT (US); Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 16/953,706

(22) Filed: Nov. 20, 2020

(65) Prior Publication Data
US 2022/0164200 A1 May 26, 2022

(51) Int. Cl.
*G06F 11/34* (2006.01)
*G06F 9/451* (2018.01)
(Continued)

(52) U.S. Cl.
CPC .............. *G06F 9/451* (2018.02); *G06F 9/542* (2013.01); *G06F 11/302* (2013.01);
(Continued)

(58) Field of Classification Search
CPC ..................................................... G06F 16/367
See application file for complete search history.

(56) References Cited

U.S. PATENT DOCUMENTS

| 10,146,751 | B1 * | 12/2018 | Zhang | .................. | G06F 16/313 |
| 2011/0231499 | A1 * | 9/2011 | Stovicek | ................. | H04L 51/42 |
| | | | | | 709/206 |

(Continued)

FOREIGN PATENT DOCUMENTS

CN          111429083 A      7/2020

OTHER PUBLICATIONS

Disclosed Anonymously, "Generic Parsing of Unstructured Data Sources," IPCOM000256657D, IP.com Electronic Publication Date: Dec. 19, 2018, 8 pages.

(Continued)

*Primary Examiner* — Di Xiao
(74) *Attorney, Agent, or Firm* — Patterson + Sheridan, LLP (57) ABSTRACT

Embodiments herein describe an automated process for identifying tasks that can be converted from primarily being driven by a human agent into bot-driven RPAs. This disclosure describes techniques for automatically generating RPAs by monitoring the actions of the agent and identifying corresponding events. These events can be performed on unstructured data sources and structured data sources. The events are clustered into different tasks where pattern detection techniques are used to identify common (or overlapping) events and causal relationships between the events. Using these causal relationships, the system can map events performed on unstructured data sources to events performed on structured data source. The system can then generate respective bot-RPAs for the tasks. The system can monitor, in real-time, data received from unstructured and/or structured data sources and when it identifies data for one of the bot-RPAs, automatically execute the RPA to perform the task.

15 Claims, 7 Drawing Sheets

(51) Int. Cl.
  *G06F 9/54* (2006.01)
  *G06F 11/30* (2006.01)
  *G06F 40/00* (2020.01)
  *G06F 40/216* (2020.01)
  *G06N 5/025* (2023.01)
  *G06Q 10/0631* (2023.01)
  *G06Q 10/0633* (2023.01)

(52) U.S. Cl.
  CPC .......... *G06F 11/3438* (2013.01); *G06F 40/00* (2020.01); *G06F 40/216* (2020.01); *G06N 5/025* (2013.01); *G06Q 10/06316* (2013.01); *G06Q 10/0633* (2013.01)

(56) References Cited

U.S. PATENT DOCUMENTS

| | | | | |
|---|---|---|---|---|
| 2013/0055268 | A1* | 2/2013 | Amershi | G06F 9/46 718/101 |
| 2020/0206920 | A1 | 7/2020 | Ma et al. | |
| 2020/0364357 | A1* | 11/2020 | Kindel, Jr. | G05B 23/02 |
| 2020/0371818 | A1* | 11/2020 | Banne | G06F 40/20 |
| 2021/0055943 | A1* | 2/2021 | Hinton | G06F 9/45512 |
| 2021/0122051 | A1* | 4/2021 | An | G06F 11/0751 |

OTHER PUBLICATIONS

Disclosed Anonymously, "Method and System for Automatic Log Discovery, Identification, Collection and Parsing," IP.com No. IPCOM000250171D, IP.com Electronic Publication Date: Jun. 7, 2017, 5 pages.

Disclosed Anonymously, "Method and System for Automatic Discovery and Execution of Tasks Associated with Recurring Calendar Entries," IP.com No. IPCOM000221943D, IP.com Electronic Publication Date: Sep. 17, 2012, 5 pages.

Du et al., "DeepLog: Anomaly Detection and Diagnosis from System Logs through Deep Learning," Session F2: Insights from Log(in)s; CCS'17, Oct. 30-Nov. 3, 2017, 14 pages.

Crest, "Cyber Security Monitoring and Logging Guide," Version 1, 2015, 60 pages.

Deloitte, "Digital Risk Management," IIA, Nov. 2018, 24 pages.

McKinsey, "Driving impact at scale from automation and AI," Feb. 2019, 100 pages.

* cited by examiner

UNSTRUCTURED EXTENSIONS TO RPA

BACKGROUND

The present invention relates to generating a robotic process automation (RPA) by identifying mapping between events performed on structured and unstructured data.

Call centers, customer support agents, IT hotlines, and the like typically have complex processes to assist customers with sales, account questions, upgrades, IT issues, and the like. These processes require an agent to glean information from the user (by email, telephone, or chat) and then perform a specified task. Despites these tasks being performed on a workstation (e.g., a computer), they are still manual processes that are primarily driven by the agent.

SUMMARY

According to one embodiment of the present invention, a method includes identifying events based on monitoring agent actions performed on a workstation when performing a task multiple times where the identified events correspond to both unstructured and structured data sources, identify groupings of duplicate events in the identified events that each correspond to a common event using pattern matching, identify causal relationships between the common events, mapping, based on at least one of the causal relationships, a first common event corresponding to the unstructured data source to a second common event corresponding to the structured data source, and generating an ordered list of instructions for a robotic process automation (RPA) of a bot based on the mapped events.

Another embodiment described herein is a system that includes a processor and memory comprising one or more applications configured to perform an operation when executed by the processor. The operation includes identifying events based on monitoring agent actions performed on a workstation when performing a task multiple times where the identified events correspond to both unstructured and structured data sources, identify groupings of duplicate events in the identified events that each correspond to a common event using pattern matching, identify causal relationships between the common events, mapping, based on at least one of the causal relationships, a first common event corresponding to the unstructured data source to a second common event corresponding to the structured data source, and generating an ordered list of instructions for a RPA of a bot based on the mapped events.

Another embodiment described herein is computer program product for programmatically generating an RPA based on monitoring agent actions. The computer program product includes computer readable storage medium having computer readable program code embodied therewith to perform an operation. The operation includes identifying events based on monitoring agent actions performed on a workstation when performing a task multiple times where the identified events correspond to both unstructured and structured data sources, identify groupings of duplicate events in the identified events that each correspond to a common event using pattern matching, identify causal relationships between the common events, mapping, based on at least one of the causal relationships, a first common event corresponding to the unstructured data source to a second common event corresponding to the structured data source, and generating an ordered list of instructions for a RPA of a bot based on the mapped events.

DETAILED DESCRIPTION

The embodiments herein describe an automated process for identifying tasks that can be converted from primarily being driven by an agent into a bot-driven RPA. For example, a bot in the workstation can perform the tasks automatically without user input. While RPAs can be programmed manually (e.g., by a programmer), this disclosure describes techniques for automatically generating RPAs by monitoring the actions of an agent. That is, the embodiments below identify events corresponding to the agent's actions. These events can be performed on unstructured data sources (e.g., telephone conversations, emails, and chat logs) and structured data sources (e.g., an operating system, database, and I/O device commands). The events are then separated into different tasks where pattern detection techniques are used to identify common (or overlapping) events and causal relationships between the events. Using these causal relationships, the system can map events performed on unstructured data sources to events performed on structured data source, such as an agent copying data in an email (e.g., an unstructured data source) and pasting that data into a service request form of a software application (e.g., a structured data source). The system can then generate respective bot-RPAs for the tasks. The system can monitor, in real-time, data received from an unstructured data source and when it identifies data for one of the bot-RPAs, automatically execute the RPA to perform the task, without input from the agent. However, in other embodiments, the bot can engage with the agent to seek missing information needed to execute the RPA, which in turn may cause the agent to engage with the customer thereby generating additional events the bot can use to execute the RPA.

Figure 1:
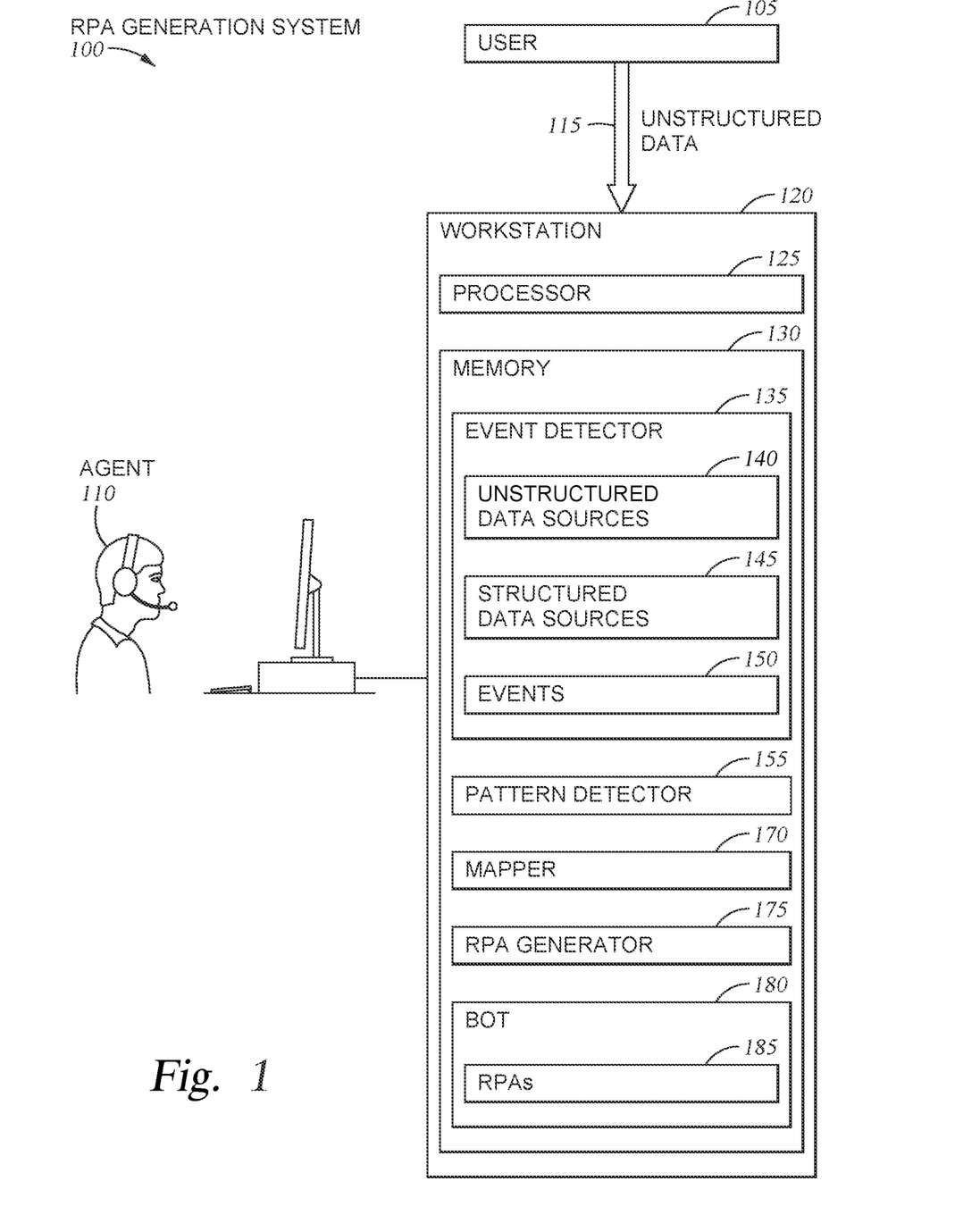
FIG. 1 illustrates an RPA generation system, according to one embodiment described herein.

FIG. 1 illustrates an RPA generation system 100, according to one embodiment described herein. The system 100 includes a workstation 120 for an agent 110 that receives unstructured data 115 from a user 105. For example, the agent 110 may be a customer service agent that helps a customer (e.g., the user 105) buy a product, sign up for a subscription service, alter a payment plan, receive technical support, and the like. The unstructured data 115 can be any data provided by the user 105 such as a spoken words, a chat log, an email, or other electronic communication (e.g., a text or post on social media). As such, the agent 110 may be currently conducting a conversation with the user 105 over the phone or in a live chat. Alternatively, the agent 110 may be responding to an email communication sent by the user 105. In general, the unstructured data 115 is data that does not use a predefined format or syntax as is often the case with natural language. In contrast, structured data is data that does prescribe to a format or syntax such as a database query, programming code, and the like.

The workstation 120 includes a processor 125, which represents one or more processing elements that may each have one or more processing cores, and memory 130 which can include volatile memory elements, non-volatile memory elements, and combinations thereof. The memory 130 stores several software applications or modules that include an event detector 135, pattern detector 155, clustering module 160, RPA generator 175, and a bot 180.

The event detector 135 is responsible for identifying various events 150 that correspond to actions performed by the agent 110. That is, as the agent 110 performs various actions when performing a task on behalf of the user 105 (e.g., changing a subscription of the user, troubleshooting an IT issue, resolving a fraudulent charge, etc.), the event detector 135 can identify events 150 corresponding to those actions. These events 150 can be performed on data from unstructured data sources 140 (e.g., a voice call or live chat between the agent 110 and the user 105 or an email sent by the user 105) or structured data source 145 (e.g., a database, service application, and the like).

The clustering module 160 evaluates the events 150 to assign them to different tasks 165. That is, the event detector 135 may identify events 150 for many different tasks 165. The clustering module 160 can use clustering techniques (which are described in more detail below) to identify which of the events 150 correspond to which tasks 165. For example, over time, the agent 110 may perform many actions for many different tasks 165. The clustering module 160 determines which action (and which of the corresponding events 150) is part of which task 165. Some events 150 may be part of multiple tasks 165 (e.g., querying a customer service database).

The pattern detector 155 identifies the order and causality between events in the same task. For example, before the agent 110 fills out a form to upgrade the user's subscription (a first event), the agent 110 first copies user data from a user communication (a second event). In this example, the second event must occur before the first event can occur. The pattern detector 155 can identify which events 150 in a particular task 165 have a causal relationship with other events. Some events 150 in a task may not have any ordering or chronological restrictions.

The mapper 170 links together related events. Using the causal relationships identify by the pattern detector 155, the mapper 170 can determine what events performed on data from an unstructured data source 140 are precursors for events performed on data corresponding to a structured data source 145. For example, before the agent 110 can query a database to look up the user's current subscription (which is an example of an event performed on a structured data source 145), the agent 110 first receives identifying information from the user 105 such as the user's account number or other identifying data (which is an event corresponding to an unstructured data source 140). The mapper 170 can also establish relationships between events corresponding to two structured data sources 145 such as querying a database to look up the user's current subscription and submitting a change order to upgrade the user's subscription.

After mapping the events 150 and identifying any causal relationships, the RPA generator can generate an RPA 185 for each of the tasks 165. The bot 180 can monitor the unstructured data source 140 (e.g., emails, a live transcript of a telephone conversation, or a live chat) to see if the user 105 has provided input data corresponding to one of the RPAs 185. If so, the bot can execute the RPA 185 automatically, without authorization from the agent. For example, if the user 105 states to the agent 110 "I want to upgrade my home interne for account 123456789 from 50 MB/s download speeds to 100 MB/s download speed," the bot can match this input data to an RPA 185 for changing the download speed of a subscription, retrieve the required data from the transcript, and populate the change request form. The agent 110 then only has to review and submit the change request form. This enables the agent 110 to be more efficient since she does not have to do many of the steps manually. In this manner, the system 100 can, by monitoring actions performed by the agent 110 when completing a variety of tasks, identify and automate future iterations of the same tasks using the bot 180.

Figure 2:
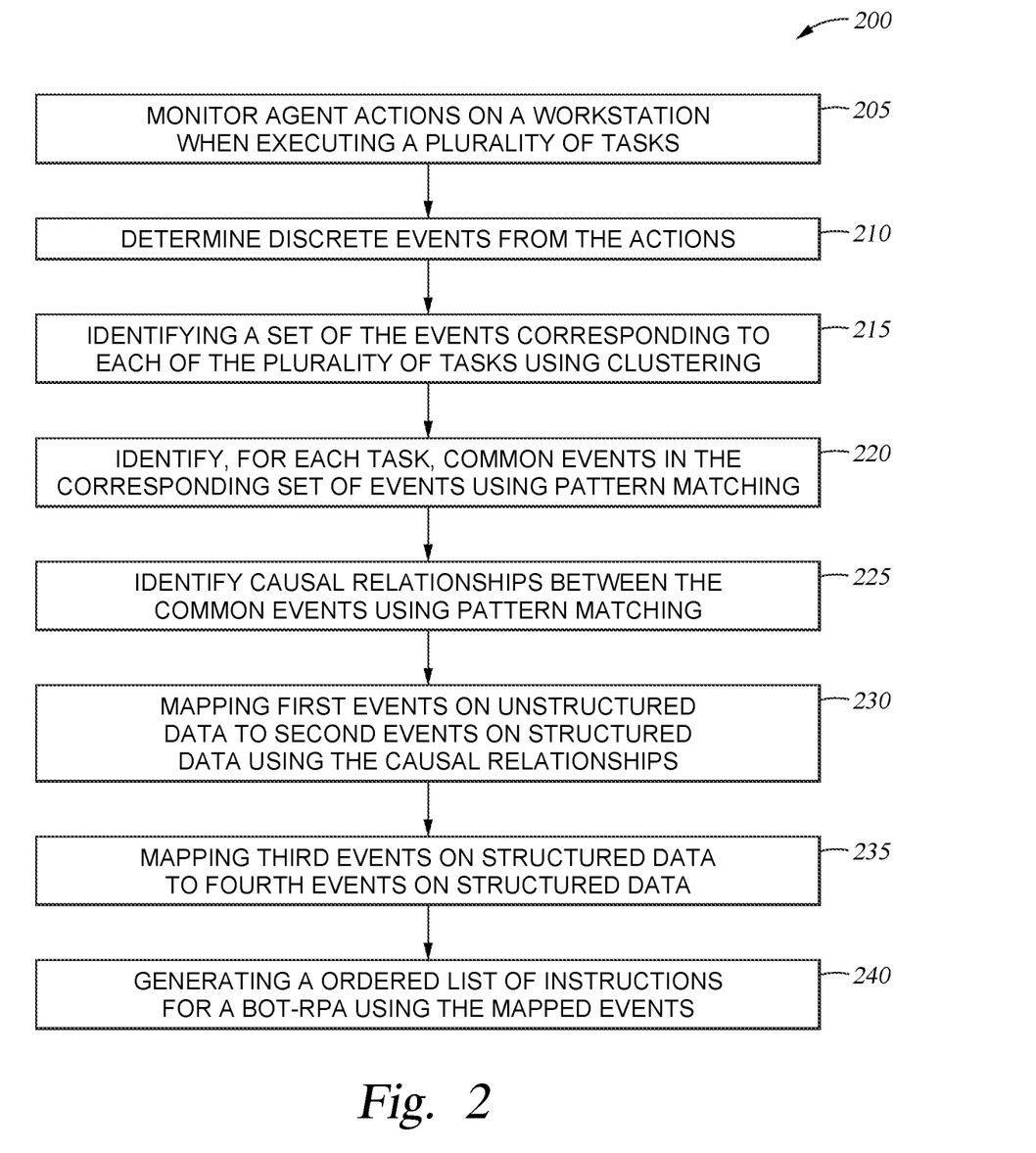
FIG. 2 is a flowchart for generating a bot-RPA, according to one embodiment described herein.

FIG. 2 is a flowchart of a method 200 for generating a bot-RPA, according to one embodiment described herein. At block 205, an event detector monitors agent actions on a workstation when executing a plurality of tasks. An agent may perform many different actions when executing different tasks. For example, the agent may have to glean information from an unstructured data source such as a telephone conversation, chat, or email from a customer, use that information to identify a workflow for performing the task desired by the customer, perform the identified workflow using the information provided by the customer, and then submit a change order. The workflow can vary depending on the type of task desired by the customer (e.g., resolving a charge dispute, cancelling service, upgrading service, adding features, troubleshooting, etc.).

Because an agent can perform many tasks, the event detector can identify actions for all these tasks. In one embodiment, the event detector may not know which actions are part of which tasks. That is, at the time the agent performs the action, the event detector may not know which customer task the agent is currently performing. The embodiments herein provide techniques so that the workstation can later determine which actions are part of which tasks. However, in other embodiments, the event detector may know which actions are part of which tasks. When identifying the actions, the event detector can label them as part of a particular task.

At block 210, the event detector determines discrete events from the actions. That is, the agent action can be broken down or subdivided into different discrete events (e.g., discrete atomic events). For example, the agent action of "conducting a conversation with the customer" may be broken down into discrete events such as "asking the user for account information in a chat," "copying a user account from the chat log," and "copying a requested upgrade date from the chat log." Further, the user action of "querying a database" can be broken down into discrete events such as "instructing the operating system to open the database," "opening a search querying box," "pasting a user account number into the search querying box," and "hitting the search button to begin a search of the database." The various techniques for identifying discrete events from the agent actions are described in more detail later in FIG. 5.

Figure 3:
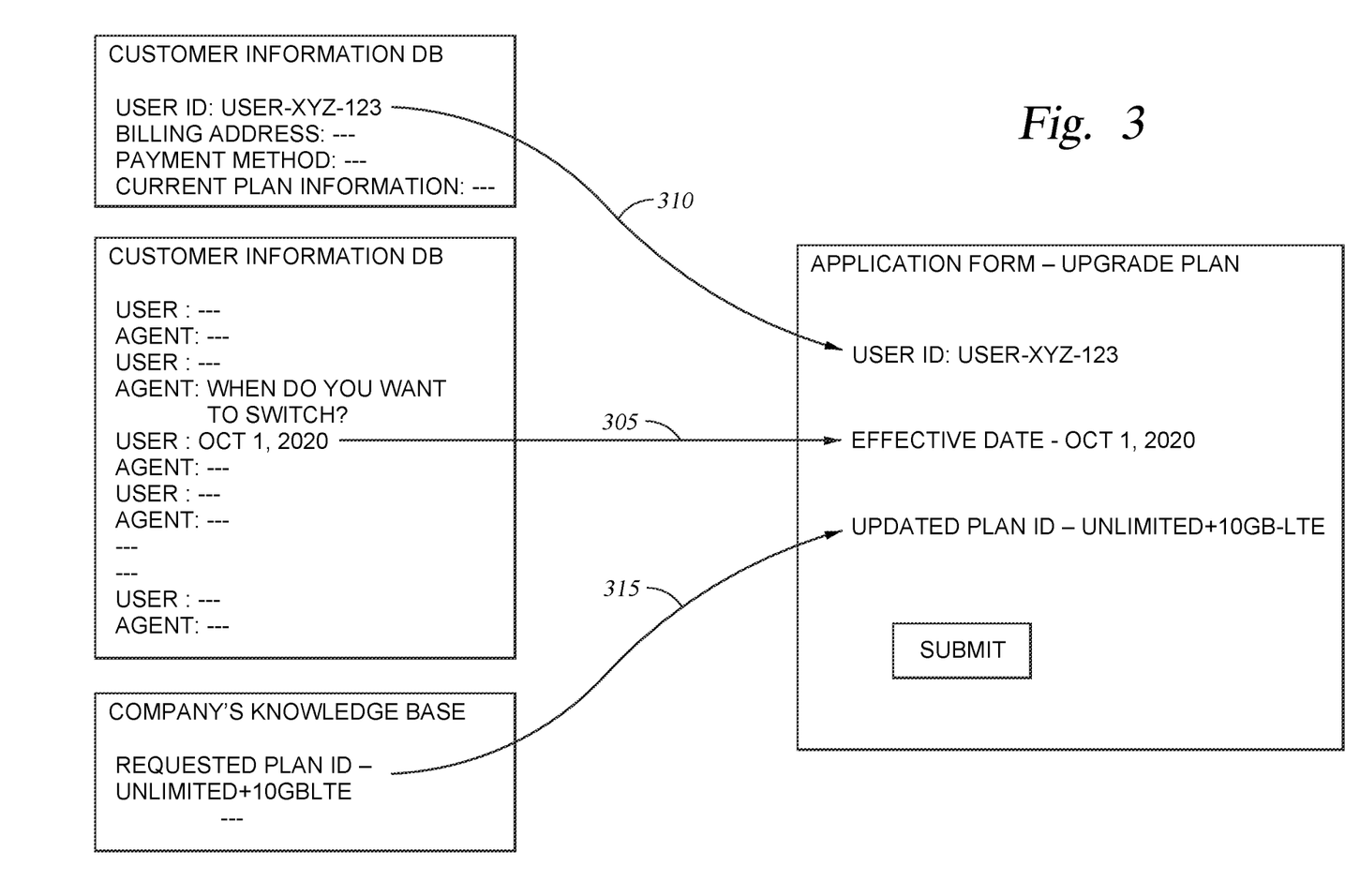
FIG. 3 illustrates actions performed by an agent when fulfilling a task, according to one embodiment described herein.

FIG. 3 illustrates actions performed by an agent when fulfilling a task, according to one embodiment described herein. FIG. 3 illustrates various events that occur with respect to structured and unstructured data sources. For example, arrow 305 indicates the agent has copied a date provided by the customer (i.e., Oct. 1, 2020) and pasted that date in an Application Form—Upgrade Plan. The event detector may identify two events associated with the arrow 305: (1) copying data from the unstructured data source (i.e., the conversation) and (2) pasting data into the Application Form.

Arrow 310 indicates the agent has executed a query on a Customer Information Database (DB), copied the customer user ID, and pasted that ID into the Application Form. Again, the event detector may divide this user action into multiple discrete events: e.g., opening the Customer Information DB, executing a query on the DB, copying the User ID from the query results, and pasting the User ID into the Application Form.

Arrow 315 indicates the agent has identified the upgrade desired by the customer from the Company's Knowledge Base. For example, the customer may have simply stated she wants faster speeds. By looking at the customer's current plan after querying the Customer Information DB, the agent can identify the plan with faster speed—i.e., Unlimited+10 GB-LTE—from the Company's knowledge base and paste that plan name into the Application Form. Although not shown, the agent can then press the SUBMIT button in the Application Form to complete the task. In this manner, FIG. 3 illustrates varies agent actions that can be performed when executing a task and how those actions can be subdivided into discrete events by the event detector.

Returning to method 200, at block 215, the clustering module identifies a set of the discrete events corresponding to each of the plurality of tasks. As mentioned above, the event detector may not know which agent actions, and thus, which events, correspond to which tasks. In this example, the clustering module can assign the discrete events to a specific task. However, the event detector may have categorized the events into a specific task at block 210, which would mean block 215 may be omitted.

The clustering module can use many different techniques to determine which events correspond to which tasks. In one embodiment, the clustering algorithms generate item sets and discover the most frequent item set to build the clusters, or an algorithm that represents the database in the form of a tree called a frequent pattern tree or FP tree. These algorithms can be used to build clusters, where each cluster has a different set of events (from both structured and unstructured data sources).

In one embodiment, the clustering module uses a different clustering technique in order to cluster events corresponding to utterances from conversations between the agent and customer. To get a representation for each utterance, the clustering module can map each utterance (one sentence or multiple-sentences) to a real-valued vector. The clustering module can also break down one utterance to multiple utterances by the same speaker to get a representation for each sentence separately. These real-valued vectors (also known as embeddings) can be built by many approaches, where the term frequency—inverse document frequency (tf-idf) approach is one simple way, or using pre-trained bidirectional encoder representations from transformers as another way that uses recent neural network-based approaches. Once the clustering module has an embedding representation for each utterance, the clustering module can build clusters for events in conversations using, e.g., K-Means, Ordering Points To Identify the Clustering Structure (OPTICS), etc.

At block 220, the pattern detector identifies, for each task, common events in the corresponding set of events using pattern matching. For example, the event detector may capture and identify events over multiple iterations of a task. As a result, there is likely to be overlap between the events. For example, each time the agent performs Task A, she queries a customer service database to identify a particular workflow. The pattern detector can use pattern matching to identify these overlapping or duplicate events and condense them into a single common event. Put differently, the pattern detector identifies groupings of duplicate events which each correspond to a respective common event. In this manner, the pattern detector can identify the set of events used to perform Task A one time.

Figure 4A:
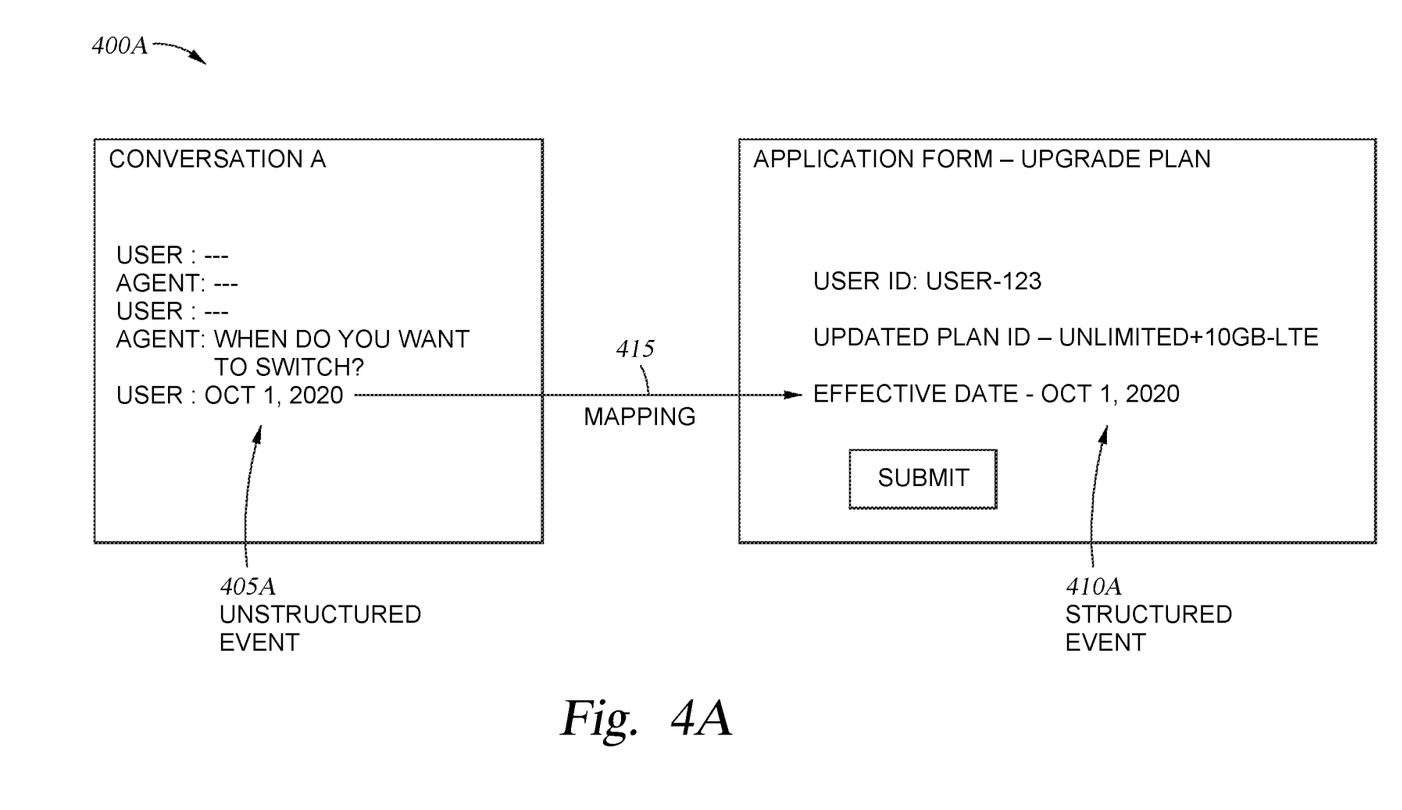
FIGS. 4A-4C illustrate overlapping events generated when performing multiple iterations of the same task, according to one embodiment described herein.
Figure 4B:
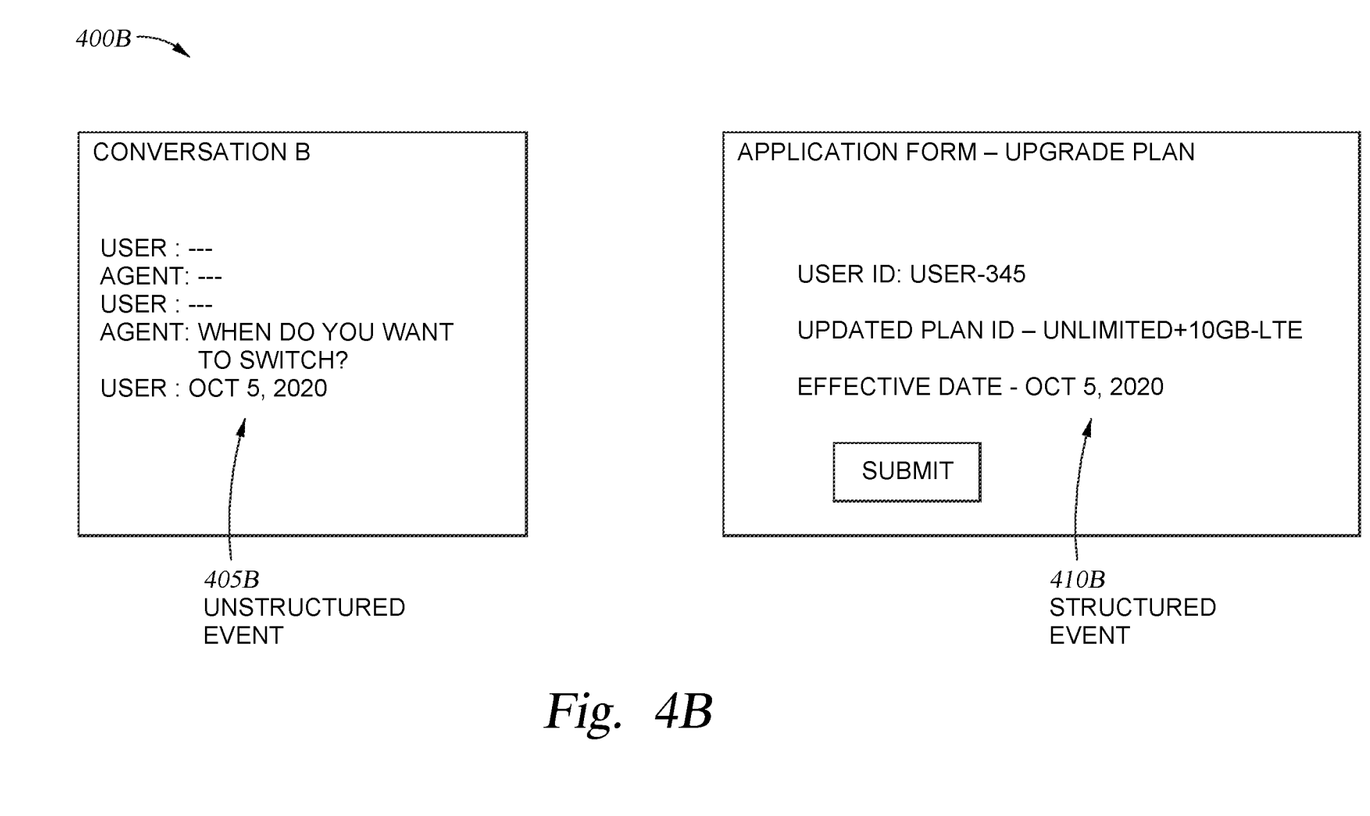
Figure 4C:
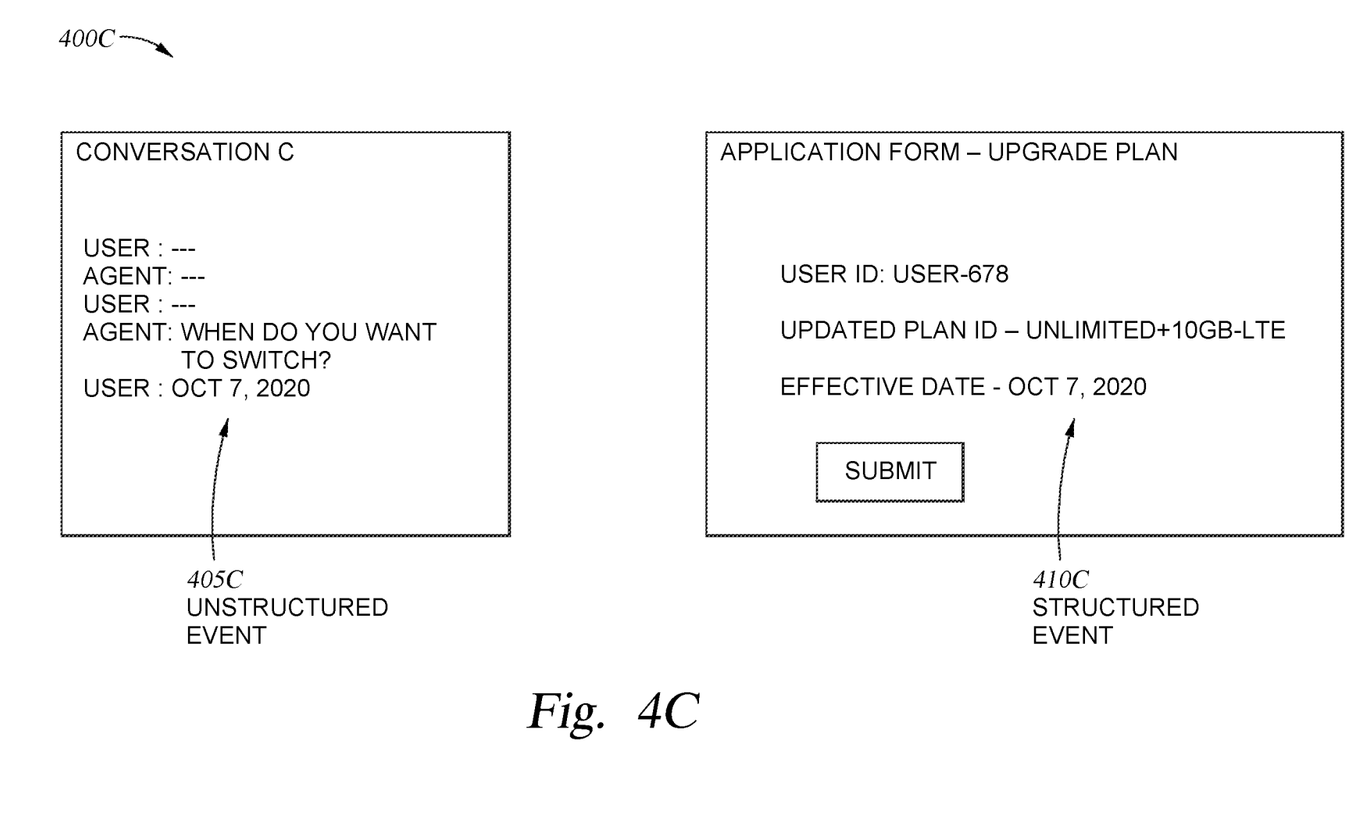

FIGS. 4A-C illustrate overlapping events generated when performing multiple iterations of the same task, according to one embodiment described herein. FIGS. 4A-4C illustrates overlapping events that occur when an agent (or agents) performs the same task multiple times as indicated by Tasks 400A-C. In each iteration of the task 400, the agent performs an unstructured event 405 where the agent copies data from an unstructured data source—i.e., Conversation A, B, or C—and a structured event 410 where the agent pastes data into a structured data source—i.e., the Application Form Upgrade Plan. In this example, the structured data source is the same in each iteration of the task 400, but the unstructured data source is different—e.g., three different conversations with three different customers.

The pattern detector can identify that the three unstructured events 405A-C (e.g., a first grouping) all correspond to the same common event and condense these events into a single event—i.e., identifying an upgrade date in the unstructured data source. Similarly, the pattern detector can identify that the three structured events 410A-C (e.g., a second grouping) all correspond to the same common event and condense these events into a single common event—i.e., entering the date provided by the customer into the structured data source. In this manner, the pattern detector can remove or condense duplicate or redundant events into a single common event.

In one embodiment, the pattern detector performs sequential pattern analysis to identify common events from the agent actions. The sequential pattern analysis can be performed using several algorithms such as the Generalized Sequential Pattern (GPS) algorithm or by performing Sequential Pattern Discovery using Equivalence classes (SPADE).

Further, the events may be captured across multiple workstations and multiple agents. Different agents, however, may use different actions than other agents to perform the same task. For example, when performing Task A, a seasoned agent may skip certain actions such as identifying the corresponding workflow since she may have it memorized, while a more junior agent may have to look up the workflow in the customer service database each time she performs Task A. Thus, there may be fewer events associated with the seasoned agent when performing Task A than with the junior agent. The pattern detector may not know whether an event should be included as part of the task or might be an unnecessary event that should not be added to the RPA. In one embodiment, to resolve this ambiguity, the pattern detector determines whether the majority of iterations of a task have the same event. If so, the pattern detector includes the event in the set of events for performing the task; if not, the pattern detector does not include the event in the RPA.

Returning to the method 200, after the pattern detector has condensed overlapping events into common events and determined the set of events in each task, at block 225 the pattern detector identifies causal relationships between these events again using pattern matching. The pattern detector can determine which events are predicated on a previous event happening, or stated oppositely, which events must happen first before another event can occur. Some events are not dependent chronologically on any other event. These events can be performed in the RPA at any time.

In one embodiment, the pattern detector uses the FP-growth algorithm to identify how often a first event occurs if a second event occurs. Doing so enables the pattern detector to determine whether the first event has a causal relationship with the second event (e.g., the first event is predicated on the second event happening first).

Once the causal relationships between the events for a task are known, at block 230 the mapper can map first events on unstructured data to second events on structured data using these relationships. Using FIGS. 4A-C as an example, the unstructured events 405 have a causal relationship with the structured events 410. The pattern detector can identify and mark these relationships. The mapper can then link these events by mapping the unstructured events 405 to the structured events 410 so that this relationship can be embodied in the RPA. Being able to map unstructured events to structured events provides a large advantage relative to techniques that only use events from structured data sources. Doing so means the bot can monitor the unstructured data sources to identify when they provide data that match the unstructured events. Thus, the RPA can begin to execute without waiting on the agent to provide or identify the data.

In addition to mapping unstructured events to structured events, at block 235 the mapper maps third events on structured data to fourth events on structured data. An example of such a mapping is found in FIG. 2 where data generated by querying the Customer Information DB is copied and pasted into the Application Form. By mapping events together, the causal relationships can be embodied into the bot-RPA so that the bot has sufficient information to execute each event in the task by executing the events in a particular order.

At block 240, the RPA generator generates an ordered list of instructions for a bot-RPA using the mapped events. These instructions may represent the mapped event but be formatted into a syntax that is readable or executable by the bot. That is, after identifying the number and ordering of the events, the RPA generator can convert these events into a set of instructions that form the RPA. The RPA generator can perform this step for each set of mapped events to generate a respective bot-RPA for each task.

Figure 5:
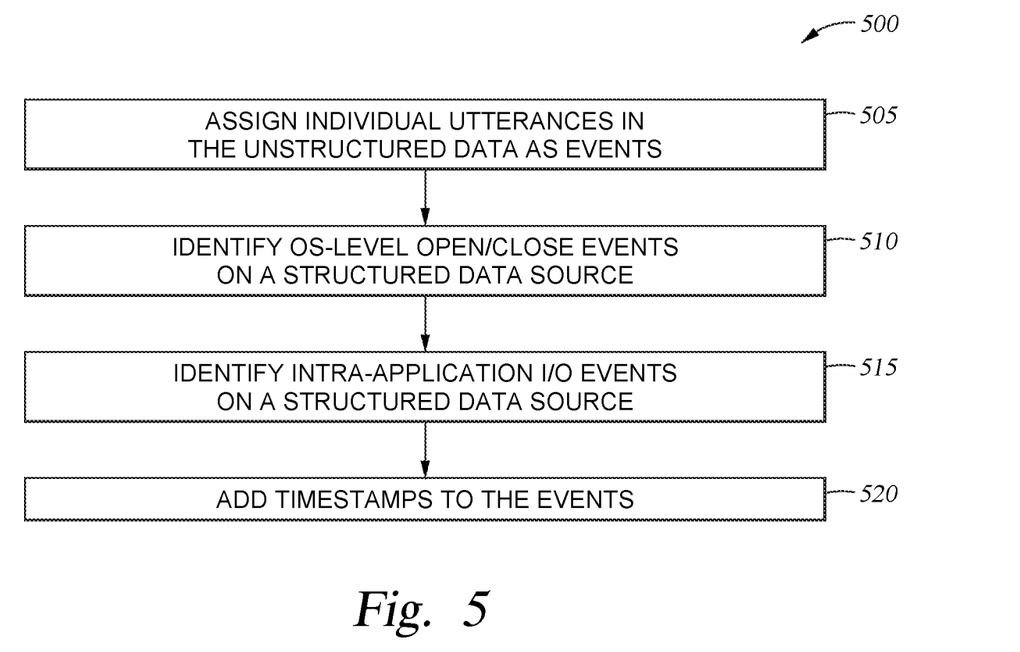
FIG. 5 is a flowchart for identifying events from agent actions, according to one embodiment described herein.

FIG. 5 is a flowchart of a method 500 for identifying events from agent actions, according to one embodiment described herein. The method 500 explains various embodiments for performing block 210 of method 200 for determining discrete events from the agent actions. The method 500 is just one example of determining discrete events and should not be interpreted as the only way to perform block 210 of the method 200.

At block 505, the event detector assigns individual utterances in the unstructured data as events. For example, each utterance from the agent and each utterance of the customer may be a separate event. The unstructured data originates from an unstructured data source such as a vocal conversation, chat, email, etc. In the case of a vocal conversation, the unstructured data may first be obtained by executing a natural language processing application to convert audio into a text-based transcript. This conversion can be performed in real-time or almost real-time. If the unstructured data source is a live chat or email, then the unstructured data can be pulled directly from the chat log or the body of the email.

In one embodiment, the event detector uses Named Entity Recognition (NER) to assign the utterances to a particular entity (e.g., different agents or the customer). NER can be performed using a variety of algorithms that can parse and tag data and use a statistical model to predict which tag or label most like applies in the context—e.g., identify which utterance to assign to a particular entity. The event detector can also identify the intent or purpose of the utterances in an unsupervised manner by, e.g., leveraging the application level events which occur after a certain utterance or building a topic model where the topics correspond to the user's intents (e.g., unsupervised dialogue intent detection via hierarchical topic model). Determining intent using the application level events can be done after the pattern detector performs the event association/causality identification at blocks 225 and 230. Further, if intent classification methods trained for the domain/customer are already available, then the event detector can use these methods in addition to the proposed unsupervised approaches.

At block 510, the event detector monitors the operating system (OS) in the workstation to identify OS-level open and close events on a structured data source. For example, the event detector can determine when, in response to a command from the agent, the OS opens and closes a particular application as part of performing a task. Using FIG. 2 as an example, the event detector may determine when the OS opens and closes the customer information DB, and when the OS opens a new Application Form.

At block 515, the event detector identifies intra-application input/output (I/O) events on a structured data source. These events include the agent entering information into the structured data source (e.g., entering a search query in a database), the agent navigating within the structured data source (e.g., switching between tabs in a customer service application), or the agent coping data from the structured data source (e.g., coping a user ID from a customer information database).

In one embodiment, these intra-application I/O events can be detected by monitoring the agent's keystrokes, mouse clicks (and the location of the mouse), and other I/O device commands (e.g., commands from a keyboard, mouse, touch screen, gaze tracker, and the like). This enables the event detector to determine what information was entered into the structured data source, how the structured data source was manipulated or updated, and what data was taken from the data source.

At block 520, the event detector adds timestamps to the events, both the events corresponding to the structured data sources and the unstructured data sources. In one embodiment, the event detector adds timestamps to each utterance in the conversation (e.g., each time the agent and the customer say/type a phrase or response). For structured events, the event detector may add a timestamp to each keystroke or mouse click, and well as the OS events. The timestamps may then be used by the pattern detector when identifying the causal relationships at block 225 in the method 200 in order to identify chronological order of the events. In one embodiment the timestamps share a common timing source such as using the clock for the OS as the timing source for all monitoring within the workstation.

Figure 6:
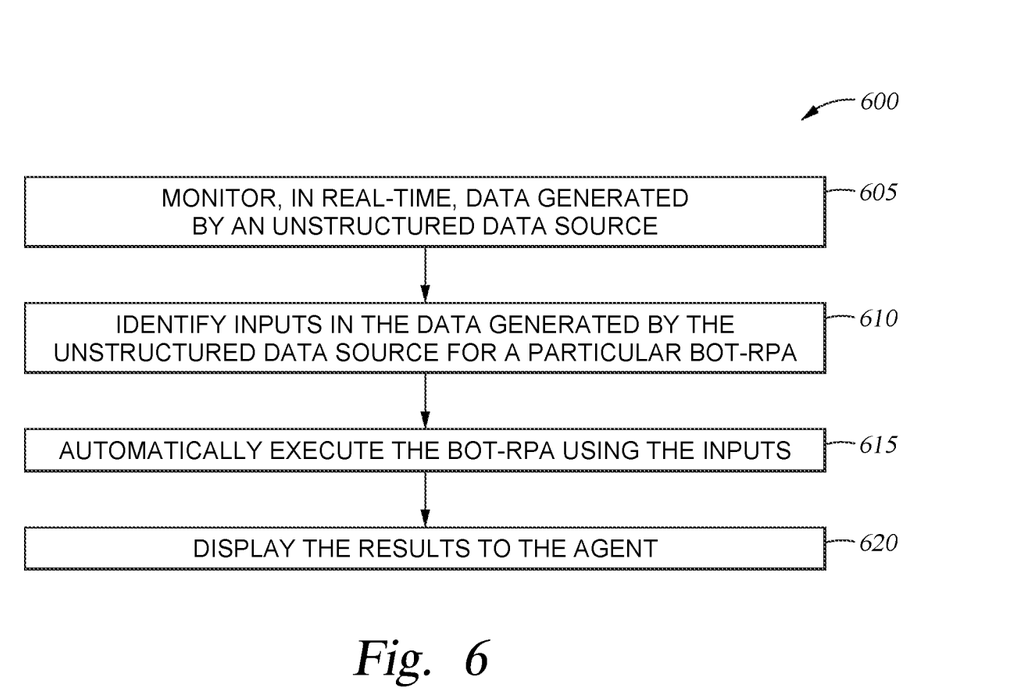
FIG. 6 illustrates monitoring an unstructured data source to determine when to execute a bot-RPA, according to one embodiment described herein.

FIG. 6 illustrates a flowchart of a method 600 for monitoring an unstructured data source to determine when to execute a bot-RPA, according to one embodiment described herein. In one embodiment, the method 600 is performed after method 200 is used to identify at least one bot-RPA. However, in other embodiments, the method 200 may be used to identify multiple bot-RPAs, each corresponding to a different task performed by an agent.

At block 605, the bot monitors, in real-time (or close to real-time), data generated by an unstructured data source. For example, the bot may evaluate emails received from a customer, or the chat log of a chat occurring between the agent and a customer. If the unstructured data source is a telephone call, the audio of the call may first be transcribed into text, which then can be processed by the bot.

At block 610, the bot identifies inputs in the data generated by the unstructured data source for a particular bot-RPA. In one embodiment, the bot attempts to match information in the data generated by the unstructured data source to inputs required by a particular RPA. For example, an RPA to upgrade the customer's cell phone subscription to more data may require the customer to indicate a desire to upgrade her current plan, a requested upgrade date, and identifying information to look up her current account. Once the bot identifies this information in the data generated by the unstructured data source, the bot can automatically begin executing the RPA. Thus, the bot can continuously monitor the data generated by the unstructured data source to determine when the data provides information needed by one of the RPAs.

While the bot can begin executing the RPA automatically, in other embodiments, it may first prompt the agent. For example, during a telephone call, the bot may display a prompt to the agent that says "Does the customer want to upgrade her current data caps?" If the agent confirms the bot has correctly predicted the customer's request by monitoring the data generated by the unstructured data source, the bot then executes the RPA.

At block 615, the bot automatically executes the bot-RPA using the inputs identified from the unstructured data source. That is, the bot performs the same actions as the agent would when performing the task. However, the actions performed by the bot may not be exactly the same as the actions performed by the agent (e.g., a seasoned agent may be able to skip certain actions if she already knows the answer by memory). Further, the bot may perform the actions in a different order. In any case, the result of executing the bot-RPA may be the same as if the agent performed the task.

At block 620, the bot displays the results to the agent. Using FIG. 3 as an example, the both may perform the actions indicated by the arrows 305-315 to populate the Application Form—Upgrade Plan, which means the agents does not have to perform these actions manually. The agent can then review the Application Form to identify any errors (e.g., proofread the bot's actions). If there are errors, the agent can correct them, but if not, the agent can press the submit button to complete the task. In another embodiment, the bot may perform the entire task without the agent intervening. For example, the RPA may include a step of submitting the Application Form without first displaying the form to the agent. In that case, the bot may display a prompt to the agent indicating that the task (i.e., submitting the upgrade request) was performed successfully.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    identifying events based on monitoring agent actions performed on a workstation when performing a task multiple times, wherein the identified events correspond to both unstructured and structured data sources, wherein identifying the events comprises:
        assigning individual utterances in the unstructured data source as a first set of events,
        identifying operating system (OS)-level events performed on the structured data source by monitoring actions of the OS in the workstation, and
        identifying intra-application input/output (I/O) events performed on the structured data source by monitoring an I/O device used by the agent;
    adding timestamps to the first set of events, the OS-level events, and the intra-application I/O events;
    identify groupings of duplicate events in the identified events that each correspond to a common event using pattern matching;
    identify causal relationships between the common events based on the timestamps;
    mapping, based on at least one of the causal relationships, a first common event corresponding to the unstructured data source to a second common event corresponding to the structured data source; and
    generating an ordered list of instructions for a robotic process automation (RPA) of a bot based on the mapped events.

2. The computer-implemented method of claim 1, wherein the unstructured data source originates from a human user and comprises at least one of a telephone conversation, a chat, or an electronic communication.

3. The computer-implemented method of claim 1, further comprising:
    monitoring, in real-time, data generated by a first unstructured data source;

identifying inputs in the data generated by the first unstructured data source for the RPA; and executing the RPA using the bot and the inputs.

4. The computer-implemented method of claim 3, wherein the RPA is executed automatically by the bot without user instruction.

5. The computer-implemented method of claim 1, further comprising:

identifying second events based on monitoring agent actions performed on the workstation when performing a plurality of different tasks; and identifying a set of second events corresponding to each of the plurality of different tasks using clustering; and generating, based on the sets of second events, respective lists of instructions for a plurality of RPAs, each of the plurality of RPAs corresponding to one of the plurality of different tasks.

6. A system, comprising:

a processor; and memory comprising one or more applications configured to perform an operation when executed by the processor, the operation comprises:

identifying events based on monitoring agent actions performed on a workstation when performing a task multiple times, wherein the identified events correspond to both unstructured and structured data sources, wherein identifying the events comprises:

assigning individual utterances in the unstructured data source as a first set of events, identifying operating system (OS)-level events performed on the structured data source by monitoring actions of the OS in the workstation, and identifying intra-application input/output (I/O) events performed on the structured data source by monitoring an I/O device used by the agent;

adding timestamps to the first set of events, the OS-level events, and the intra-application I/O events;

identify groupings of duplicate events in the identified events that each correspond to a common event using pattern matching;

identify causal relationships between the common events based on the timestamps;

mapping, based on at least one of the causal relationships, a first common event corresponding to the unstructured data source to a second common event corresponding to the structured data source; and generating an ordered list of instructions for a robotic process automation (RPA) of a bot based on the mapped events.

7. The system of claim 6, wherein the unstructured data source originates from a human user and comprises at least one of a telephone conversation, a chat, or an electronic communication.

8. The system of claim 6, wherein the operation further comprises:

monitoring, in real-time, data generated by a first unstructured data source;

identifying inputs in the data generated by the first unstructured data source for the RPA; and executing the RPA using the bot and the inputs.

9. The system of claim 8, wherein the RPA is executed automatically by the bot without user instruction.

10. The system of claim 6, wherein the operation further comprises:

identifying second events based on monitoring agent actions performed on the workstation when performing a plurality of different tasks; and identifying a set of second events corresponding to each of the plurality of different tasks using clustering; and generating, based on the sets of second events, respective lists of instructions for a plurality of RPAs, each of the plurality of RPAs corresponding to one of the plurality of different tasks.

11. A computer program product for programmatically generating an RPA based on monitoring agent actions, the computer program product comprising:

a computer readable storage medium having computer readable program code embodied therewith, the computer-readable program code executable by one or more computer processors to perform an operation, the operation comprising:

identifying events based on monitoring the agent actions performed on a workstation when performing a task multiple times, wherein the identified events correspond to both unstructured and structured data sources, wherein identifying the events comprises:

assigning individual utterances in the unstructured data source as a first set of events, identifying operating system (OS)-level events performed on the structured data source by monitoring actions of the OS in the workstation, and identifying intra-application input/output (I/O) events performed on the structured data source by monitoring an I/O device used by the agent;

adding timestamps to the first set of events, the OS-level events, and the intra-application I/O events;

identifying groupings of duplicate events in the identified events that each correspond to a common event using pattern matching;

identifying causal relationships between the common events based on the timestamps;

mapping, based on at least one of the causal relationships, a first common event corresponding to the unstructured data source to a second common event corresponding to the structured data source; and generating an ordered list of instructions for the RPA of a bot based on the mapped events.

12. The computer program product of claim 11, wherein the unstructured data source originates from a human user and comprises at least one of a telephone conversation, a chat, or an electronic communication.

13. The computer program product of claim 11, wherein the operation further comprises:

monitoring, in real-time, data generated by a first unstructured data source;

identifying inputs in the data generated by the first unstructured data source for the RPA; and executing the RPA using the bot and the inputs.

14. The computer program product of claim 13, wherein the RPA is executed automatically by the bot without user instruction.

15. The computer program product of claim 11, wherein the operation further comprises:

identifying second events based on monitoring agent actions performed on the workstation when performing a plurality of different tasks; and identifying a set of second events corresponding to each of the plurality of different tasks using clustering; and generating, based on the sets of second events, respective lists of instructions for a plurality of RPAs, each of the plurality of RPAs corresponding to one of the plurality of different tasks.

* * * * *